Jan. 21, 1964  D. T. BRAY  3,118,818
SUBMERSIBLE POWER UNIT
Filed April 5, 1961  2 Sheets-Sheet 1
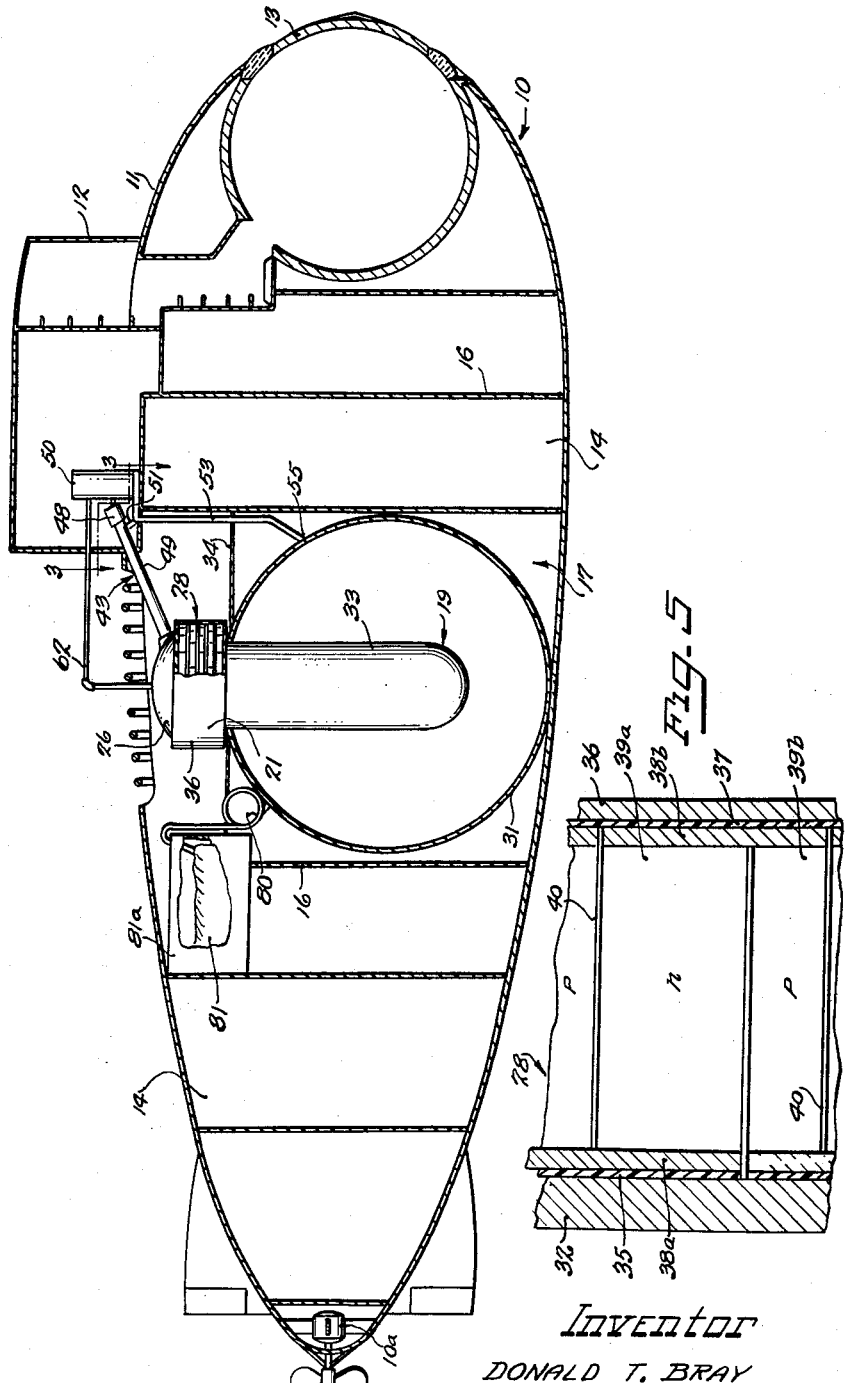
Inventor
DONALD T. BRAY
By Soans, Anderson, Luedeka & Fitch
Attys Jan. 21, 1964  D. T. BRAY  3,118,818
SUBMERSIBLE POWER UNIT
Filed April 5, 1961  2 Sheets-Sheet 2
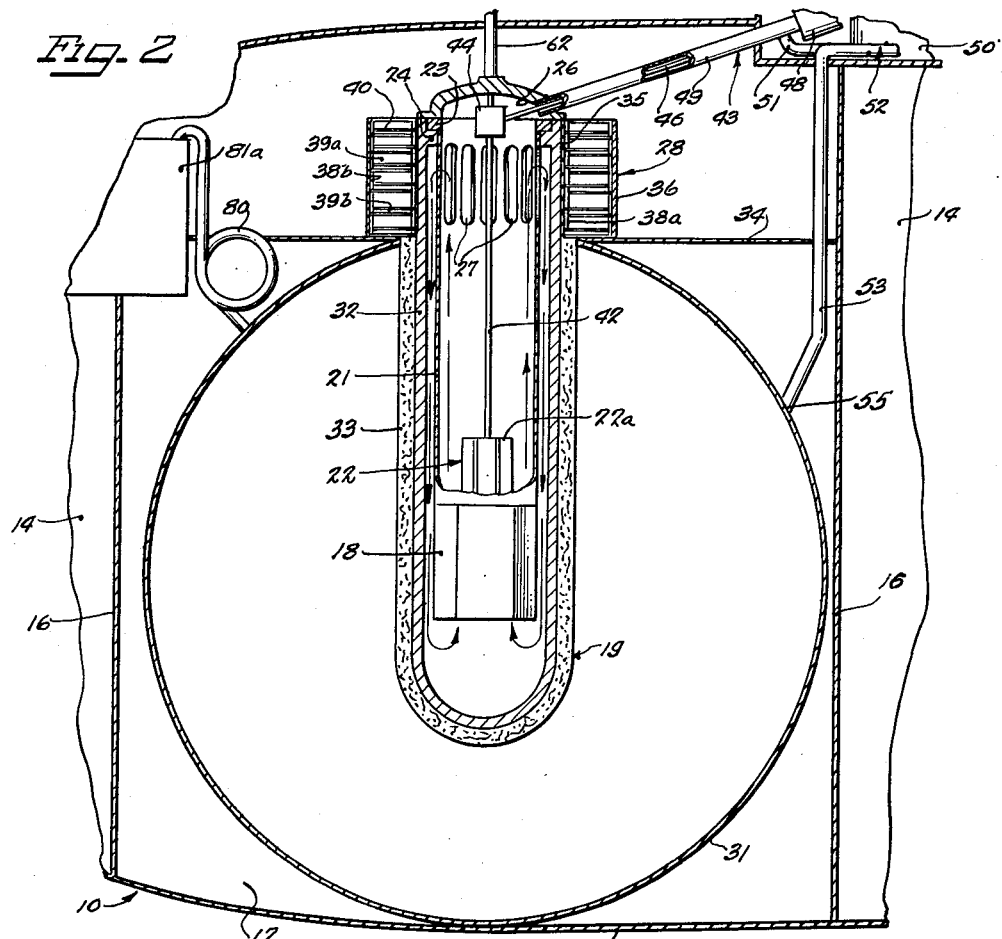
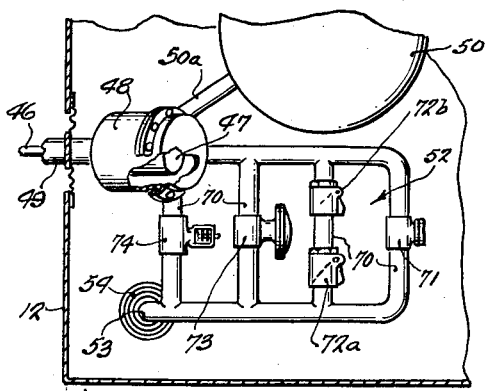
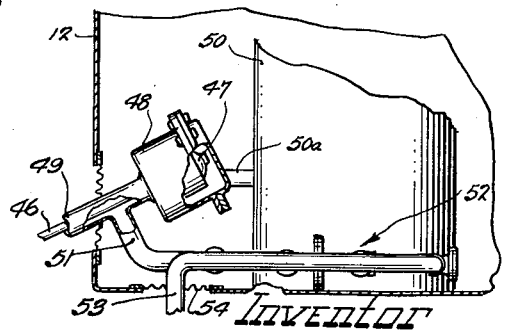
Inventor
DONALD T. BRAY
By Soans, Anderson, Luedeka & Fitch
Attys 3,118,818
SUBMERSIBLE POWER UNIT
Donald T. Bray, La Jolla, Calif., assignor to General Dynamics Corporation, New York, N.Y., a corporation of Delaware
Filed Apr. 5, 1961, Ser. No. 100,841
6 Claims. (Cl. 176—39)

This invention relates to a submersible power unit and more particularly is directed to a power unit which includes a nuclear reactor that is pressure compensated for underwater operation at substantial ocean depths.

Oceanographic research and numerous other underwater scientific and military applications call for a source of power which is economical, reliable and suitable for use during prolonged periods of underwater operation. Such a power unit should be sufficiently versatile so that it can be adapted for use as a primary or auxiliary power source in any number of devices designed for underwater operation such as bathyscaphes, underwater sonar buoys, and the like.

The use of a storage battery system for such applications has not proven satisfactory inasmuch as the duration of underwater operations is greatly limited by the available power that can be stored in such a system. Moreover, a steam turbine-generator cycle is of limited use as a source of power due to the high ambient pressures encountered at ocean depths. In general, therefore, long range underwater investigations or operations at the deeper parts of the ocean have not been feasible for prolonged periods of time due to the unavailability of a power source which can satisfy the requirements imposed by these operating conditions.

Accordingly, it is a prime object of the present invention to provide a new and improved submersible nuclear power unit which is reliable and which can operate for prolonged durations at the deepest parts of the ocean.

A further object of the invention is to provide a reliable submersible nuclear power unit which can be readily adapted for use in power driven underwater vehicles such as a bathyscaphes, or in other situations requiring an underwater power source.

Still another object of the invention resides in the provision of a submersible nuclear power unit which can satisfactorily operate at the ambient pressures encountered at ocean depths while eliminating the need for costly pressurizing equipment and heavy pressure vessels.

An additional object of the invention is to provide a submersible unit which produces power through the utilization of a reliable, inherently safe water-cooled nuclear reactor.

A more finite object of the invention is to provide a submersible nuclear power unit including a water-cooled reactor system which is pressure compensated so that it can reliably operate for prolonged intervals at ambient pressures encountered at ocean depths.

Other objects and advantages of the present invention will become apparent from the following detailed description of a preferred embodiment thereof, when considered in conjunction with the accompanying drawings wherein:

FIGURE 1 is a vertical cross-sectional view of an underwater vehicle (i.e., a bathyscaphe) adapted with a submersible nuclear power unit of the type contemplated by the present invention;

FIGURE 2 is an enlarged fragmentary sectional view of the major portion of the submersible nuclear power unit illustrated in FIGURE 1;

FIGURE 3 is an enlarged fragmentary plan view taken along the line 3—3 in FIGURE 1 which illustrates a pressure compensating system for the submersible nuclear power unit;

FIGURE 4 is a sectional view of the pressure compensating system taken along the line 4—4 in FIGURE 3; and FIGURE 5 is an enlarged fragmentary sectional view illustrating a portion of a preferred type of thermoelectric generator utilized in the submersible nuclear power unit.

In accordance with the provisions of the invention, the submersible nuclear power unit includes an inherently safe nuclear reactor that is disposed within a suitable pressure vessel. Water coolant which is passed through and heated by the operating reactor is circulated within the pressure vessel by either forced or natural convection. Mounted about the upper portion of the pressure vessel is a power producing member which converts heat generated in the circulating reactor coolant to usable electrical power.

A pressure compensating system is also included in the submersible nuclear power unit which maintains the circulating coolant in a liquid state when the unit is operating at sea level or substantial ocean depths.

A submersible nuclear power unit embodying the principal features of the present invention can be suitably adapted for use in any number of manned or unmanned underwater vehicles. Therefore, for purposes of illustration only, the following detailed description is directed to a submersible nuclear power unit adapted for use in a Trieste-type bathyscaphe 10 as illustrated in FIGURE 1.

As depicted, the bathyscaphe 10 is provided with a hull 11, a conning tower 12 and a pressure-resistant cabin 13. The hull is constructed with a plurality of buoyancy compartments 14 that are suitably separated by bulkheads 16. The compartments 14 are, in a conventional manner, gasoline filled to provide the necessary buoyancy for the bathyscaphe.

The conning tower 12 and the various other housings included in the bathyscaphe 10, excluding the pressure-resistant cabin 13, are not adapted to withstand the enormous hydrostatic ambient pressures which are encountered at the depths of the ocean. Accordingly, these enclosures are provided with suitable means (not shown) as are the individual buoyancy compartments 14, to allow the passage of sea water therein and maintain a condition of pressure equilibrium across the walls thereof.

The primary distinctions between the bathyscaphe illustrated in FIGURE 1 and the conventional Trieste-type bathyscaphe are that the central-most region of the hull 11, which is generally designated by the numeral 17, is suitably adapted to contain the submersible nuclear power unit and the manned observation cabin 13 is located within rather than beneath the hull 11.

The major components of the submersible nuclear power unit, which is mounted within the bathyscaphe 10, are best illustrated in FIGURES 2, 3 and 4. As shown in FIGURE 2, the unit includes a generally cylindrical reactor core 18 that is coaxially disposed within a cylindrical pressure vessel generally designated by the numeral 19. The reactor core 18, which is mounted for support at the lower end of a core support shroud 21, employs a plurality of elongated and generally cylindrical fuel elements that are disposed in spaced apart relation within the core 18 and cooled by the natural circulation of water therethrough.

The power requirements imposed upon the reactor core 18 require that the core be designed for operation at a high temperature approaching approximately 600° F. Accordingly, the core is designed with a moderator having long life stability at high temperatures, and the cladding therefor is fabricated of stainless steel to minimize the effects of corrosion.

As illustrated in FIGURE 2, the core is also provided with a single six blade control rod 22. This single six blade control rod contains poisons in an upper region 22a and a material such as Zircaloy is provided in the lower region (not shown) to preclude water from occupying the space in the core that is vacated when the rod has been withdrawn and the core is in an operative state. The Zircaloy acts as a follower and prevents thermal neutron peaking during operation of the reactor.

Although the fuel element composition and certain other structural features of the reactor core 18 are distinct, the core is functionally similar to that disclosed and claimed in the copending application of the common assignee, Serial No. 732,415, which was filed May 9, 1958. That is, both the reactor core 18 and the core disclosed in the previously filed application are characterized by a prompt negative temperature coefficient which insures reliable operation coupled with inherently stable control of reactor power.

The core support shroud 21, which is mounted within the pressure vessel 19 and which is preferably cylindrical in shape, has an outwardly extending flange 23 formed at the upper extremity thereof. The outer diameter of the flange 23 is slightly smaller than the inner diameter of the pressure vessel 19, and this flange rests on an annular support ring or bracket 24 that is welded to the inside surface of the pressure vessel wall. The support bracket 24 is spaced from the upper extremity of the pressure vessel 19 a sufficient distance so that the flange 23 of the core support shroud 21 may be supported thereon. In addition, sufficient clearance is provided so that a removable pressure vessel top or cover 26 can be secured in pressure-tight relation with the upper extremity of the pressure vessel. As illustrated, a plurality of apertures 27 are formed at the upper extremity of the core support shroud 21 in alignment with the wall of the vessel 19 whereto a cylindrical thermoelectric unit 28 is mounted in thermal contact. These apertures 27 allow heated reactor coolant emanating from the reactor core 18 to be freely and substantially uniformly circulated across the hot junction of the thermoelectric generator.

The core support shroud 21 performs two essential functions. Namely, this member serves to support the reactor core 18 and separates the hot and cold legs of a reactor coolant which is circulated by natural convection through the reactor core. Accordingly, the inner surface of the core support shroud is provided with a layer of thermal insulation, and heat generated in the coolant emanating from the reactor core is not dissipated through the wall of the shroud into the cooled water that has been circulated past the hot junctions of the thermoelectric unit 28.

The pressure or containment vessel 19, which contains the core 18 and core support shroud 21, is mounted so that the lower portion thereof is disposed within a reactor shield tank or housing 31. The vessel 19 is provided with a generally cylindrical wall 32 that has a coating of thermal insulation 33 about the portion thereof that is disposed within the shield tank. The wall 32 of the pressure vessel is preferably fabricated of a material resistant to corrosion by sea water. The major portion of the pressure vessel 19 that extends out of and above the reactor shield tank 31 and above a suitable support plate 34 is also insulated. However, as illustrated, the thermoelectric generator is mounted in thermal contact over much of the peripheral surface of the vessel at this location.

The pressure vessel 19 with associated dome-like cover 26 is designed to contain the circulating reactor coolant. In the illustrated embodiment, the water coolant is circulated by natural convection up through the reactor core 18 and through the plurality of apertures 27 which are formed in the reactor core support shroud 21 (FIG. 2). The water circulated through the apertures 27 flows past the hot junctions of the individual thermoelements that constitute the thermoelectric generator 28 and serves as the heat source for this unit. The cold junction for the individual thermoelectric elements or heat sink is provided by sea water that is circulated up and around the reactor shield tank and across the shielded outer surface of the thermoelectric generator 28.

The slightly cooled water flowing past the inner surface of the wall 32 of the reactor pressure vessel 19, whereto the thermoelectric generator 28 is secured in thermal contact, is thereafter circulated to the bottom of the pressure vessel through the space defined by the walls of the pressure vessel and core support shroud 21. This continuous circulation of the heated reactor coolant during operation of the reactor results in the production of thermoelectric power that may be utilized to power the bathyscaphe 10 during prolonged underwater excursions.

As illustrated in FIG. 2, the thermoelectric generator 28 is mounted on the upper portion of the pressure vessel in spaced relation to the reactor core 18 so that the thermoelectric materials are not damaged by radiation emanating from the core. The generator 28 is a substantially cylindrical unit that is structurally and thermally connected to the wall 32. More particularly, a coating of electrical insulation 35 is provided on the inner surface of the thermoelectric generator 28 (FIG. 5) and is mounted in thermal contact with the outer surface of the pressure vessel wall 32. The entire outer circumferential surface as well as the upper and lower surfaces of the thermoelectric generator 28 are suitably encased by a shell 36 that is resistant to corrosion by sea water.

The shell 36 is insulated from the individual thermoelements which constitute the thermoelectric generator 28 by a coating of electrical insulation 37 which is similar to the coating of insulation provided adjacent the wall of the pressure vessel 19. Situated between the concentric layers or coatings of insulation 35 and 37 are a pair of concentric electrically conductive plates 38a and 38b. These electrically conductive plates serve to insure a series electrical connection between adjacent thermoelements, each of which consists of a ring segment 39a of n-type semiconductor material and a ring segment 39b of p-type semiconductor material. The n and p-type semiconductor elements 39a and 39b are suitably bonded to the conductive members 38a and 38b. Interposed between each pair of dissimilar semiconductor elements 39a and 39b is a layer 40 of electrical insulation which serves to preclude short circuiting between adjacent thermoelements.

It can be seen that the passage of the heated reactor coolant across the inner surface of the pressure vessel wall 32 results in heat flow being directed through a plurality of parallel thermally conductive paths that are provided by the stacked thermoelements. More particularly, this heat flow passes through the parallel thermally conductive paths provided by adjacent n and p-type semiconductor elements 39a and 39b and is dissipated in the sea water which encompasses the outer shell 36 of the generator 28.

The concomitant passage of heat flow through adjacent semiconductor elements 39a and 39b results in the generation of a thermoelectric voltage thereacross. Inasmuch as each individual thermoelement is serially connected to the immediately adjacent thermoelements, a cumulative thermoelectric voltage of substantial magnitude is developed by the thermoelectric generator 28. Suitable conductors (not shown) are connected to the thermoelectric generator 28 and serve to distribute this generated thermoelectric power to the electrically driven instrumentalities in the system.

The operation of the reactor which develops the thermal energy utilized by the thermoelectric generator 28 is remotely controlled by a control rod drive mechanism 43, best illustrated in FIGURE 2. The control rod drive mechanism 43 includes a coupling member 44 which is secured to a shaft 42 that is mechanically secured to the control rod 22. The coupling member 44 links the shaft 42 for vertical movement relative to a driven member 46. The driven member 46 extends between the coupling member 44 and a control rod drive motor 47 that is mounted within a cylindrical housing 48 in the conning tower 12 of the bathyscaphe. The driven member is mounted within a pressure reinforced guide tube 49 which extends from the wall of the reactor vessel to the housing for the control rod drive motor.

As illustrated in FIGURES 3 and 4, the housing 48 communicates with a hydrogen filled tank or pressurizer unit 50 through a conduit member 50a. Similarly, the guide tube 49 is slotted adjacent the housing 48 and communicates with a tubular conduit member 51 that is associated with a pressure compensating valving system, generally designated by the numeral 52. The pressure compensating system 52 is coupled to the reactor shield tank or housing 31 through a conduit member 53 that extends through a flexible joint 54 in the floor of the conning tower and is mounted within an aperture 55 formed in the wall of the shield tank. The pressurizer unit 50 and the valving system 52 cooperatively function to allow the submersible nuclear power unit to operate at sea level or any desired ocean depth.

More particularly, the hydrogen filled cylinder or pressurizer unit 50 functions to maintain the reactor water coolant in a liquid state by establishing a pressure within the vessel which is greater than the vapor pressure of water at the operating temperature of the reactor. This allows the submersible nuclear power unit to be satisfactorily operated at sea level and at depths whereat the ambient sea water pressure is less than the vapor pressure value corresponding to the selected reactor operating temperature.

Associated with the pressurizer unit 50 is a conduit member 62 which extends from the pressure vessel 19 and, more particularly, from an aperture formed in the dome-like cover 26. This conduit member completes a path for coolant flow from the reactor pressure vessel and through the tank 50 to the control rod drive motor housing 48. Accordingly, during operation of the reactor a portion of the water coolant flows by natural convection from the top of the pressure vessel 19 through the conduit member 62, the hydrogen tank 50 and the conduit member 50a to the housing 48. This flow provides a continuous supply of hydrogenated water for the reactor pressure loop and suppresses oxygen gas formation therein.

As the submersible nuclear power unit is subjected to greater ambient pressures, the liquid level in the tank 50 will rise and compress the hydrogen contained therein so that the tank also acts as a surge cushion for the reactor loop. The tank is so constructed that no control of the liquid level is attempted; however, prior to the time that the reactor is rendered operable a minimum water level is established within the tank by a suitable level control and pump means (not shown).

From the foregoing it is apparent that the pressure vessel must be constructed to withstand a maximum pressure which is somewhat greater than the vapor pressure of water at the operating temperature of the reactor core 18 which is mounted therein. No greater pressures will be exerted on the wall 32 of the pressure vessel 19 inasmuch as the pressure compensating system 52, which is hereinafter described, insures that the entire unit operates at ambient sea water pressure when the vessel is submerged to a depth whereat this ambient pressure is equal to or greater than the pressure initially established within the vessel 19 by the pressurizer unit 50. For purposes of illustration, representative pressure values will be utilized in the description of the pressure compensating system, and these values will correspond to a reactor core operating temperature of approximately 550° F.

In a preferred embodiment of the invention, the pressure compensating valving system 52, which cooperatively functions in conjunction with the pressurizer unit 50, includes four distinct parallel passages 70 (FIG. 3). Individual pressure responsive units are situated within each of these parallel passages. The first of these individual pressure responsive units is a rupture disc 71 which will burst if the pressure in the reactor pressure vessel 19 exceeds the pressure in the shield tank 31 by more than 1200 p.s.i. The second of these pressure responsive units is a double check valve 72a—72b which allows the flow of water from the shield tank into the reactor pressure loop when the ambient pressure is equal to or greater than the pressure within the vessel 19.

Still another of these pressure responsive units is an off-on ambient pressure regulated valve 73 which remains tightly shut when the ambient pressure is less than 1100 p.s.i. and is fully opened when the pressure is greater than 1100 p.s.i. Thus, for operation at depths where the ambient pressure is greater than 1100 p.s.i., the pressure in the reactor loop is always equal to the pressure in the shield tank which in turn, as will be described later, is maintained at the ambient sea pressure through a flexible diaphragm. The final pressure responsive unit provided by the pressure compensating valving system 52 is a pressure relief valve 74 that allows the flow of water from the reactor pressure valve loop to the reactor shield tank 31 when the pressure in the vessel 19 exceeds the pressure in the housing by more than 1100 p.s.i.

In addition to the pressurizer unit 50 and the pressure compensating valving system 52, other instrumentalities are provided for the submersible nuclear power unit and are mounted for operation within the hull of the bathyscaphe 10. Included among these auxiliary devices are a shield tank pressure equalizing expansion bag 81 and a conventional demineralizer unit. The expansion bag 81 is preferably fabricated of plastic or rubber and is connected externally of the shield tank or housing 31 through a conduit member 80. The expansion bag 81 is mounted within a support housing 81a so as to be exposed to the ambient sea water pressure (FIGS. 1 and 2). Preferably, the expansion bag 81 has a capacity of approximately 150 cubic feet and serves to accommodate the volume changes which occur in the reactor pressure loop and shield water tank 31 during start up of the submersible nuclear power unit and during the prolonged operation thereof at sea level and substantial underwater depths.

The demineralizer unit, which is provided to maintain suitable water purity in the reactor coolant, is designed to operate at the reactor loop pressure. More particularly, the demineralizer includes a heat exchanger and a suitable pump or circulating means (not shown) that is utilized to pass the reactor coolant from the pressure vessel 19, through a resin bed contained within the housing 81a and back to the reactor loop.

*Mode of Operation*

The operation and capabilities of the submersible nuclear power unit will best be appreciated from a consideration of the manner in which the unit functions as a power source for the bathyscaphe 10. When it is desired to render the submersible nuclear power unit effective, the pressurizer unit 50, the control instrumentalities for the demineralizer unit and the reactor control rod drive motor 47 will be actuated into operation.

Upon being rendered effective, the pressurizer unit 50 effects the build up of the pressure within the reactor loop and, more particularly, within the vessel 19 to a value of approximately 1100 p.s.i. As previously disclosed, this pressure is somewhat greater than the vapor pressure of water at the contemplated operating temperature of the reactor (i.e., 1045 p.s.i.). Similarly, the demineralizer unit, when rendered operative, serves to purify the water being circulated through the reactor core 18 after this member has been placed in an operating state. This later function is accomplished by the withdrawal of the single six blade control rod 22 as a result of the actuation of the control rod drive motor 47.

When the reactor core 18 has been placed in an operating state and during the time that this operating condition is being established, the reactor coolant will be circulated by natural convection upwardly from the bottom of the vessel 19 through the coolant passages provided in the reactor core. This natural convection of the demineralized coolant through the reactor core 18 results from the buoyant force which is exerted on the lower density hot water passing through the core by the higher density cooler water contained in the upper portion of the pressure vessel between the vessel wall and the core support shroud 21.

As the coolant is circulated upwardly through the core, the heated water passes through the apertures 27 in the core support shroud 21. The heated water passing through the apertures 27 is substantially uniformly distributed across the inner surface of the vessel wall 32, which acts as the hot junction for the thermoelectric generator 28. The outer shielded surface of the thermoelectric generator being disposed in sea water serves as the cold junction therefor. The resulting temperature differential which exists across the thermoelectric generator 28 results in the generation of electrical energy which is transmitted as needed to the various electrically powered bathyscaphe instrumentalities by a plurality of suitable watertight conductors (not shown). In this manner, a continuous supply of electrical energy is developed by the generator 28. Among other things, a portion of this developed energy is utilized by a motor driven unit 10a to provide the propulsive force for the bathyscaphe.

While the submersible nuclear power unit is operated at sea level, thermoelectric power is continuously generated in the manner hereinbefore described due to the circulation of the heated reactor coolant within the pressure vessel 19. During this time, the pressurizer unit 50 maintains a pressure within the vessel of approximately 1100 p.s.i. When the unit is submerged to depths below approximately 2500 feet, the ambient sea water pressure approaches the pressure previously established within the vessel 19 by the unit 50. Consequently, the ambient pressure regulated valve 73, which constitutes one of the elements of the pressure compensating valving system 52, will become fully opened so that the ambient pressure and reactor loop pressures are equalized. As the unit is further submerged, the valve 73 will remain in a fully open position and the reactor loop and ambient pressures will be maintained in equilibrium.

During start up and as the submersible nuclear power unit is submerged and surfaced, the various other individual pressure responsive units within the system 52 will insure that the proper pressure conditions are maintained in the reactor loop as previously described. In addition, the expansion bag 81 which is contained within the housing 81a will function to insure that the pressure in the reactor shield tank 31 is constantly in equilibrium with the ambient sea water pressure. Consequently, it can be seen that, as the submersible nuclear power unit is operated at various ocean depths, the pressure conditions under which the reactor loop functions are suitably regulated.

In a specific embodiment of the invention, the shield tank or housing 31 is constructed of steel plating approximately ¼ inch thick. The tank is approximately 15 feet in diameter and contains a supply of demineralized water that serves as a shield for neutron radiation emanating from the reactor pressure or containment vessel 19. The pressure vessel, which is designed to withstand a pressure of approximately 1500 p.s.i. at temperatures approaching 600° F., is constructed of a corrosion resistant material such as one-inch thick Inconel or other suitable high nickel-chromium iron alloy. In addition, the vessel 19 is proportioned with an inside diameter of approximately 32 inches and is approximately 15 feet in height.

The cylindrical support shroud 21 has a diameter which is approximately equal to the diameter of the reactor core 18 and is constructed of a stainless steel plate approximately ⅛ of an inch thick. A layer of thermal insulation approximately ¼ inch thick is used on the inner surface of the core support shroud. The apertures 27 provided in the upper surface of the shroud 21 are formed and arranged so that the heated water being circulated therethrough is uniformly distributed to the hot junction of the thermoelectric generator 28.

The reactor core 18, which is mounted on the core support shroud 21, includes approximately 110 fuel elements that are clad in stainless steel jackets and have suitable stainless steel end fixtures. Each fuel element is approximately 21 inches in length and 1½ inches in diameter. The fuel bodies contain an alloy of uranium and zirconium hydride in weight proportions of about 8 and 92 percent, respectively. In addition, each fuel element contains approximately 37 grams of U-235 and has a thin, stainless steel, burnable poison-containing washer located at each end thereof. A number of dummy fuel elements, which are preferably hollow tubes fabricated of a material such as Zircaloy, are used in the spare fuel element locations around the periphery of the core to minimize the bypass of the reactor coolant around the active elements.

The single six blade control rod 22 which is mechanically coupled to the control rod drive motor 47 is situated within the reactor core 18 for vertical movement relative thereto. The control rod has a span of approximately 11 inches and an over-all blade height of approximately 28 inches. Each of the six control rod blades contains an absorber plate which is preferably constructed of an alloy containing cadmium, indium, and silver in weight proportions of 5, 15 and 80 percent respectively. The plates which are approximately ¼ inch thick, 4 inches wide, and 14 inches in over-all height are mechanically secured to the Zircaloy construction of the blades, which includes the Zircaloy follower formed on the lower portion thereof.

The thermoelectric unit 28 which is mounted in thermal contact with the outer surface of the pressure vessel wall 32 contains approximately 20,000 individual thermoelectric elements. These elements are mounted in stacked relation to each other and provide a plurality of parallel paths for heat flow being passed from the heated reactor coolant through the thermoelectric generator 28 to the surrounding sea water. The n-type semiconductor material utilized in a preferred embodiment of the invention is lead telluride doped with lead iodide while the p-type semiconductor material is lead telluride doped with sodium. The electrical insulators which are utilized to insure against electrical short circuiting of the thermoelectric elements are preferably fabricated of mica.

The entire thermoelectric generator 28 is constructed with the various individual components thermally and/or electrically bonded together to eliminate void spaces. This construction of the thermoelectric generator 28 insures that the generator can withstand the substantial compressive forces that will be imparted thereto when the submersible nuclear power unit is operating at the ocean depths.

During operation, a submersible nuclear power unit constructed in accordance with the provisions of the invention can deliver approximately one megawatt of thermal power with the reactor core 18 operating at a temperature of approximately 550° F. in a sea water environment having a temperature of approximately 50° F. Assuming a thermoelectric efficiency of 5 percent, approximately 50 kilowatts of electrical power can be continually produced by such a power unit. These latter figures will of course be dependent upon the particular structural configuration and components chosen for the thermoelectric generator 28.

While described herein for use in a Trieste-type bathyscaphe, the submersible nuclear power unit can manifestly be adapted for use in any number of underwater applications wherein an inherently safe and reliable power source is required. In addition, various modifications of the described and disclosed structural and functional characteristics of the power unit can readily be devised by those skilled in the art without deviating from the invention. For example, the structural features of

What is claimed is:

1. A submersible nuclear power unit which comprises a pressurized water-filled containment vessel, a water-cooled reactor core, means supporting said water-cooled reactor core within said containment vessel, means rendering said reactor core operative, the water within said vessel being circulated through said reactor core during the operation thereof and across the pressurized containment vessel wall, means mounted about at least a portion of the pressurized containment vessel wall whereacross the water from said core is circulated for generating thermoelectric power from heat developed within said circulating water by said operating core, and means communicating with said containment vessel for equalizing the pressure within the vessel and the ambient pressure when the vessel is submerged to a depth whereat the ambient pressure is greater than the vapor pressure of water at the operating temperature of the reactor.

2. A submersible nuclear power unit which comprises a water-filled reactor containment vessel, a reactor core, means supporting said reactor core within said water-filled containment vessel so that water is circulated through said core during the operation thereof, means establishing an operating pressure within said containment vessel which is greater than the vapor pressure of the water contained therein at the operating temperature of the reactor, means rendering said reactor core operative, means mounted about at least a portion of said containment vessel for producing useable electrical power from heat generated in the water coolant being circulated through said operating reactor core, and means communicating with said containment vessel for maintaining the pressure therein substantially in equilibrium with the ambient pressure when the vessel is submerged to a depth whereat the ambient pressure is greater than the pressure initially established therein.

3. A submersible nuclear power unit which comprises a pressurized water-filled containment vessel, a water-cooled reactor core, means supporting said water-cooled reactor core within said containment vessel, means rendering said reactor core operative, the water within said vessel being circulated through said reactor core during the operation thereof and across the pressurized containment vessel wall, a thermoelectric generator mounted about at least a portion of the pressurized containment vessel wall whereacross the water from said core is circulated for generating thermoelectric power from heat developed within said circulating water by said operating core, said thermoelectric generator being spaced from said reactor core so as to preclude radiation damage thereto during the operation of said reactor core, and means communicating with said containment vessel for equalizing the pressure within the vessel and the ambient pressure when the vessel is submerged to a depth whereat the ambient pressure is greater than the vapor pressure of water at the operating temperature of the reactor.

4. A submersible nuclear power unit which comprises a water-filled reactor containment vessel, a reactor core, means supporting said reactor core within said water-filled containment vessel so that water is circulated through said core during the operation thereof, means establishing an operating pressure within said containment vessel which is greater than the vapor pressure of the water contained therein at the operating temperature of the reactor, means rendering said reactor core operative, a thermoelectric generator mounted about at least a portion of said containment vessel for producing useable electrical power from heat generated in the water coolant being circulated through said operating reactor core, and a pressure responsive valving system communicating with said containment vessel for maintaining the pressure therein substantially in equilibrium with the ambient pressure when the vessel is submerged to a depth whereat the ambient pressure is greater than the pressure initially established therein.

5. A submersible power unit for producing electrical power from nuclear energy at sea level and during submergence to substantial ocean depths; which submersible power unit comprises a water filled pressure vessel; a nuclear reactor core; a shroud supporting said reactor core within said pressure vessel so that water is circulated through said core during the operation theeof; said supporting shroud defining a path for the circulating water coolant such that the coolant circulates from a lower portion of said pressure vessel through said core to an upper portion of said prssure vessel and across the walls thereof; means establishing an operating pressure within said vessel which is greater than the vapor pressure of the circulating water contained therein at the operating temperature of the reactor core; means rendering said reactor core operable; a thermoelectric generator mounted about a portion of said pressure vessel wall whereacross said heated reactor coolant is circulated and in spaced relation to said core so as to preclude radiation damage thereto during the operation of said core; said thermoelectric generator being constructed so that the heat developed in the circulating water coolant flows therethrough into the surrounding sea water and results in the generation of thermoelectric energy; and a pressure responsive valving system communicating with said pressure vessel for maintaining the pressure therein substantially in equilibrium with the ambient sea water pressure when the vessel is submerged to a depth whereat the ambient pressure is greater than the pressure initially established therein.

6. A submersible power unit for producing electrical power from nuclear energy at sea level and during submergence to substantial ocean depths; which submersible power unit comprises a water filled pressure vessel; a nuclear reactor core; a shroud supporting said reactor core within said pressure vessel so that water is circulated by natural convection through said core during the operation thereof; said supporting shroud defining a path for the circulating water coolant such that the coolant circulates from a lower portion of said pressure vessel through said core to an upper portion of said pressure vessel and across the walls thereof; means establishing an operating pressure within said vessel which is greater than the vapor pressure of the circulating water contained therein at the operating temperature of the reactor core; means rendering said reactor operable; a thermoelectric generator mounted about a portion of said pressure vessel wall whereacross said heated reactor coolant is circulated and in spaced relation to said core so as to preclude radiation damage thereto during the operation of said core; said thermoelectric generator being constructed so that the heat generated in the water coolant being circulated across said pressure vessel wall serves as the heat source while the surrounding sea water serves as the heat sink and the temperature differential thereacross results in the production of a thermal electromotive force; and a valving system communicating with said pressure vessel; said valving system including at least one pressure responsive valve for maintaining the pressure therein substantially in equilibrium with the ambient sea water pressure when the vessel is submerged to a depth whereat the ambient pressure is greater than the pressure initially established therein.

References Cited in the file of this patent

UNITED STATES PATENTS

| | | |
|---|---|---|
| 1,131,712 | Klein | Mar. 16, 1915 |
| 2,685,858 | Harrison | Aug. 10, 1954 |

(Other references on following page)

OTHER REFERENCES

Proceedings of the Second United Nations International Conference on the Peaceful Uses of Atomic Energy, vol 19, held in Geneva September 1–13, 1958, pp. 309–314.

Vol. 8 of above publication, pp. 483–488, 134–139, 180–183, 196, 197.

Soviet J. of Atomic Energy, March 1961, vol. 7, No. 5, pp. 960, 961, 962.